United States Patent [19]
Shanley

[11] Patent Number: 5,574,213
[45] Date of Patent: Nov. 12, 1996

[54] APPARATUS AND METHOD FOR DETECTING LEAKS

[76] Inventor: Alfred W. Shanley, P.O. Box 692349, Houston, Tex. 77269

[21] Appl. No.: 402,614

[22] Filed: Mar. 13, 1995

[51] Int. Cl.$^6$ ................................................. G01M 3/08
[52] U.S. Cl. ........................................ 73/40.7; 73/863.71
[58] Field of Search ................................. 73/40.7, 49.2 B, 73/863.71, 864.51, 49.2 T; 250/302, 461.1; 252/964

[56] References Cited

U.S. PATENT DOCUMENTS

| | | | |
|---|---|---|---|
| 1,915,965 | 5/1931 | Williams | 436/3 |
| 2,096,099 | 10/1937 | Gaugler | 73/51 |
| 2,434,448 | 1/1948 | Wade | 250/302 |
| 3,085,423 | 4/1963 | Champion | 73/40.7 |
| 3,361,547 | 1/1968 | Packo | 48/193 |
| 3,364,729 | 1/1968 | Yearwood | 73/40.7 |
| 3,370,013 | 2/1968 | Lebac | 252/68 |
| 3,483,736 | 12/1969 | Anderson | 73/49.2 |
| 3,650,147 | 3/1972 | Moyer | 73/49.7 |
| 3,683,675 | 8/1972 | Burton et al. | 73/40.7 |
| 3,691,821 | 9/1972 | Davey | 73/49.2 |
| 3,872,712 | 3/1975 | Westervelt et al. | 73/40 |
| 4,350,038 | 9/1982 | Soncrant | 73/49.2 |
| 4,586,033 | 4/1986 | Andrejasich | 73/49.2 |
| 4,612,798 | 9/1986 | Roberts | 73/40.7 |
| 4,693,118 | 9/1987 | Roberts | 73/40.7 |
| 4,758,366 | 7/1988 | Parekh | 252/68 |
| 4,938,063 | 7/1990 | Leighley | 73/40.7 |
| 5,170,840 | 12/1992 | Grunwald | 73/40 |
| 5,357,782 | 10/1994 | Henry | 73/40.7 |
| 5,412,978 | 5/1995 | Boone et al. | 73/49.2 |
| 5,421,192 | 6/1995 | Henry | 73/40.7 |

FOREIGN PATENT DOCUMENTS

| | | | |
|---|---|---|---|
| 2503-364 | 4/1981 | France | G01M 3/26 |
| WO81/01332 | 5/1981 | WIPO | G01M 3/04 |

Primary Examiner—Hezron E. Williams
Assistant Examiner—Jay L. Politzer
Attorney, Agent, or Firm—John R. Casperson

[57] ABSTRACT

A dye is incorporated into the pressure medium used to test a vessel for pressure leaks. The dye is preferably fluorescent, and the vessel is preferably inspected using a light source which causes the dye to fluoresce. The pressure medium can vary widely, for example, air, other gas, water, or petroleum based pressure mediums can be used. When the pressure medium is gaseous, the dye is preferably atomized and introduced into the vessel along with the pressure medium. The site of any leaks is easily detected because of marking by the dye. The process eliminates the need for submerging the pressurized vessel or observing the vessel for pressure decay. The dyes used may remain within the vessel after the test procedure and have utility as a long term leak detection tool. Apparatus and leak detection methods are disclosed.

14 Claims, 2 Drawing Sheets

5,574,213

APPARATUS AND METHOD FOR DETECTING LEAKS

BACKGROUND OF THE INVENTION

The invention relates to leak detection. In certain aspects, the invention relates to leak detection using a fluorescent dye. In other aspects, the invention relates to a method and apparatus for detecting leaks.

Current industry methods for leak detection involve pressurizing the vessel to be tested with air or other gas and submerging the item in a water tank to look for air bubbles or attaching the vessel to a pressure sensor and watching for a loss of pressure.

The techniques are time consuming and complicated. They are also not very reliable. A quick and simple method to enable vessels to be leak tested and which is highly reliable would be very desirable.

The prior art techniques also fail to accurately identify the site of the leak. This makes repair difficult to execute. A technique which pinpoints the site of leaks in a vessel would be very desirable.

In air conditioning and refrigeration service, leaks in the condenser or evaporator coils can release fluorocarbons or other ozone depleting substances into the atmosphere. A technique which reduces the number of leaky coils sold to consumers would be highly beneficial to the environment.

OBJECTS OF THE INVENTION

It is an object of this invention to provide an apparatus for detecting leaks in a vessel.

It is a further object of this invention to provide a method for detecting leaks in a vessel.

It is another object of this invention to provide a method and apparatus which are highly effective for detecting leaks in air conditioner coils.

It is another object of this invention to provide a method and apparatus for detecting leaks which enable the leak to be quickly detected.

It is another object of this invention to provide a technique for detecting leaks which further enables the site of the leak to be quickly identified with a great degree of accuracy.

SUMMARY OF THE INVENTION

In one embodiment of the invention, an apparatus comprises a first conduit means, a second conduit means, a third conduit means, and a control means. The first conduit means is for supplying a flow of a carrier fluid to a vessel to be pressure tested. The first conduit means has a first valve means operably associated therewith. The first valve means is positionable in an open position or a closed position. The second conduit means is for exhausting a flow of a carrier fluid from the vessel which has been pressure tested. The second conduit means has a second valve means operably associated therewith. The second valve means is positionable in an open position or a closed position. The third conduit means is for introducing a predetermined amount of a liquid dye into the first conduit means. The third conduit means has an injection means associated therewith for causing the introduction of the predetermined amount of liquid dye into the first conduit means. The control means has (i) a means for actuating the injection means to introduce the predetermined amount of liquid dye into the first conduit means; (ii) a means for positioning the second valve means in the open position; (iii) a means for positioning the first valve means in the open position; (iv) a means for positioning the second valve means in the closed position; (v) a means for positioning the second valve means in the open position; (vi) a means for positioning the first valve means in the closed position; and (vii) a means for positioning the second valve means in the closed position. When means (i)–(vii) are sequenced by the control device, the apparatus is well suited for automatically implementing a test cycle to detecting and identifying the site of leaks in a vessel to be pressure tested.

In another embodiment of the invention, an apparatus is provided which comprises a mixer means, an injection means, and a carrier fluid supply means. The mixer means is for mixing a liquid dye with a carrier fluid. The mixer means has a carrier fluid passage having an inlet and an outlet for passage of a carrier fluid and a liquid dye passage having an inlet and an outlet for the passage of a liquid dye. The injection means is for injecting a predetermined quantity of a liquid dye into the inlet of the liquid dye passage of the mixer means. The carrier fluid supply means is for supplying a flow of carrier fluid to the inlet of the carrier fluid passage of the mixer means so that the liquid dye is mixed with the carrier fluid. The apparatus is well suited for quickly pressure testing vessels and identifying the site of any leaks which may be present, especially when a fluorescent dye is used.

In another embodiment of the invention, there is provided a method which can be used to pressure test a vessel. The method is carried out by introducing a predetermined quantity of a liquid dye into a mixer means. A flow of carrier fluid is initiated through the mixer means to mix the liquid dye in the carrier fluid and form a test mixture. The test mixture is introduced into a vessel to be pressure tested. The vessel is then pressurized and inspected for leaks.

DETAILED DESCRIPTION OF THE PREFERRED EMBODIMENTS

Figure 1:
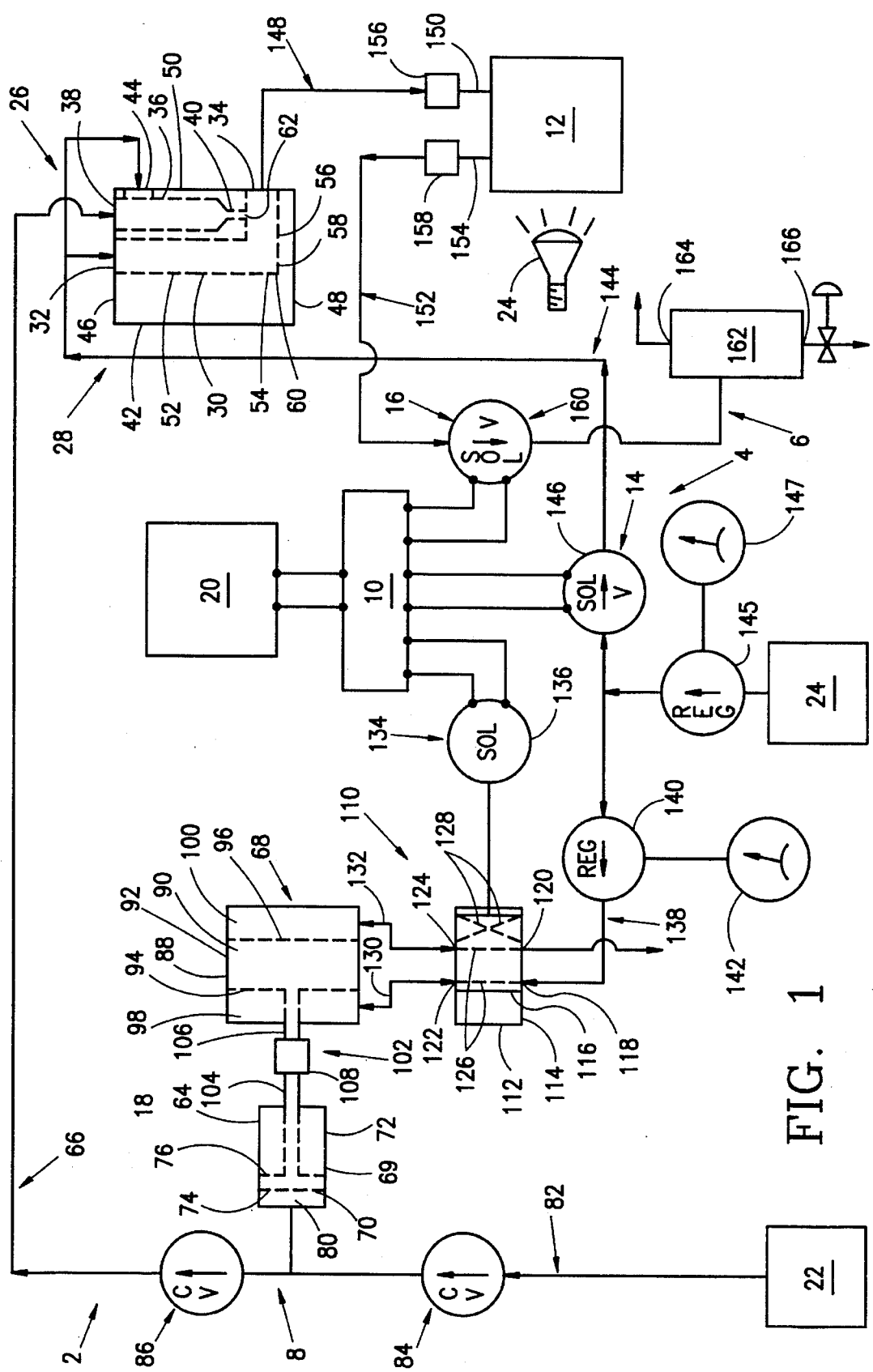
FIG. 1 schematically illustrates certain features of one embodiment of the invention.
Figure 2:
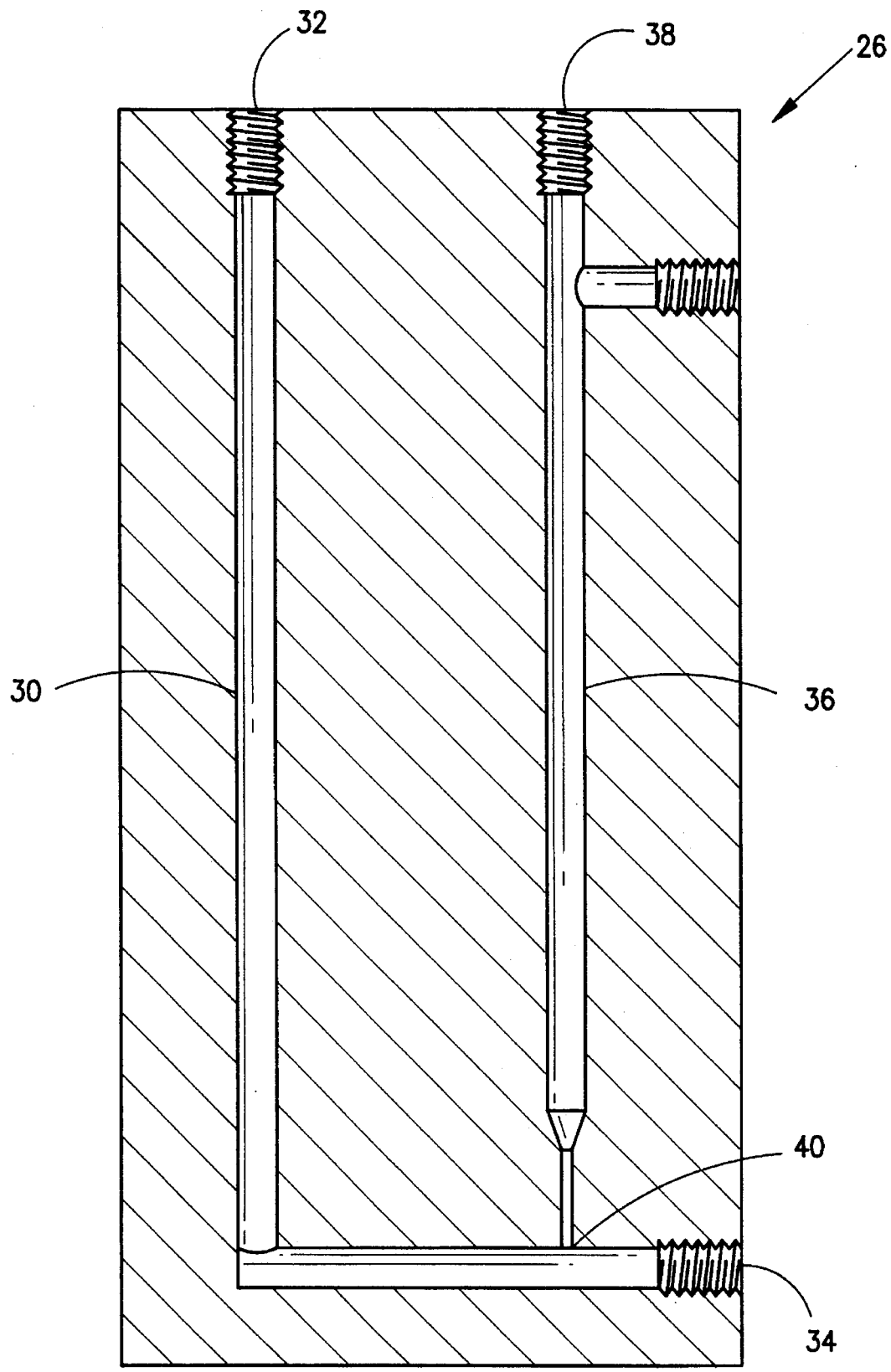
FIG. 2 is a sectional view of a portion of the device shown in FIG. 1.

In one embodiment of the invention, an apparatus 2 comprises a first conduit means 4, a second conduit means 6, a third conduit means 8, and a control means 10. The first conduit means 4 is for supplying a flow of a carrier fluid to a vessel 12 to be pressure tested. The first conduit means 4 has a first valve means 14 operably associated therewith. The first valve means 14 is positionable in an open position or a closed position. The second conduit means 6 is for exhausting a flow of a carrier fluid from the vessel 12 which has been pressure tested. The second conduit means 6 has a second valve means 16 operably associated therewith. The second valve means is positionable in an open position or a closed position. The third conduit means 8 is for introducing a predetermined amount of a liquid dye into the first conduit means 4. The third conduit means has an injection means 18 associated therewith for causing the introduction of the predetermined amount of liquid dye into the first conduit means 4. The control means 10 has (i) a means for actuating the injection means to introduce the predetermined amount of liquid dye into the first conduit means; (ii) a means for positioning the second valve means in the open position; (iii)

a means for positioning the first valve means in the open position; (iv) a means for positioning the second valve means in the closed position; (v) a means for positioning the second valve means in the open position; (vi) a means for positioning the first valve means in the closed position; and (vii) a means for positioning the second valve means in the closed position. Suitable control means are well known in the art. A Mitsubishi Model TX014 MR-ES PLC controller operating in conjunction with Humphrey solenoid valves has been tested with good results. The control means 10 is powered with a source 20 of electric power, such as commercial 110 V AC current.

In a preferred embodiment of the invention, the control means 10 further includes means for actuating means (i) through (vii) in order. Programmable controllers are well suited for this purpose. It is further preferred that the control means further includes means for actuating means (vi) a predetermined period of time after actuating means (v). For testing air conditioner condensers, a three second delay to permit carrier fluid to sweep residual dyestuff from the condenser coil has provided good results. It is still further preferred that the control means 10 further includes means for actuating means (vii) a predetermined period of time after actuating means (vi). For the air conditioner condenser application, a ten second delay has provided good results, to ensure a complete pressure let-down in the tested condenser. It is still further preferred that the controller actuate means (i) though (iv) in response to a first user command signal and means (v) through (vii) in response to a second user command signal.

When in use, the apparatus 2 will include a source 22 of liquid dye in flow communication with the third conduit means 8. Although any dye which can be made visible or detectable can be used, it is preferred that the liquid dye is luminescent, more preferably, fluorescent. The most preferred fluorescent dyes are those which fluoresce when exposed to light having a predetermined wavelength. Good results have been obtained by selecting a fluorescent dye and exposing an exterior of the vessel 12 to a light source 24 having the predetermined wavelength while inspecting the vessel for leaks. Black lights are readily commercially available and it is thus preferred to select a dye that fluoresces in black light and to expose the exterior of the vessel to black light while performing the leak detection inspection.

For inspections in difficult to reach locations, such as in heat exchangers, or for inspections around salt water, a battery powered black light will provide good results and greater safety.

Although many dyestuffs may be suitably employed in the invention, solutions containing anthraquinone, naphthalimide, or xanthene dyestuffs are expected to provide good results. The dyestuff and dyestuff solvent should be selected with safety, environmental considerations and compatibility with the equipment and process with which it is going to be used. For closed circulating systems, such a air conditioning or refrigerant systems, it is extremely important that the dyestuff-solvent mixture be non-abrasive.

The apparatus 2 also utilizes a source 24 of carrier fluid in flow communication with the first conduit means when in use. For many applications, the fluid source will be a gas source, although liquids, such as water, can be used if desired. Air is a convenient fluid source because it is cheap and is not messy to handle, although other gases, such a nitrogen or helium may also be used. Most any commercially available air compressors will form a highly suitable source 24 for many applications, such as for testing air conditioner condenser or evaporator coils. Such coils will generally have a volume of less than about 10 liters.

In another embodiment of the invention, the apparatus 2 comprises a mixer means 26, an injection means 18, and a carrier fluid supply means 28. The mixer means 26 is for mixing a liquid dye with a carrier fluid. The mixer means 26 has a carrier fluid passage 30 having an inlet 32 and an outlet 34 for passage of a carrier fluid and a liquid dye passage 36 having an inlet 38 and an outlet 40 for the passage of a liquid dye. The injection means 18 is for injecting a predetermined quantity of a liquid dye into the inlet 38 of the liquid dye passage 36 of the mixer means 26. The carrier fluid supply means 28 is for supplying a flow of carrier fluid to the inlet 32 of the carrier fluid passage 30 of the mixer means 26 so that the liquid dye is mixed with the carrier fluid.

In a preferred embodiment of the invention, the mixer means 26 is formed from a body means 42. The body means defines a first passage having an inlet and an outlet which constitutes the carrier fluid passage 30 and a second passage having a first inlet and an outlet which constitutes the liquid dye passage 36. Preferably, the second passage further having a second inlet 44 positioned between the first inlet 38 and the outlet 40. The outlet 40 of- the second passage opens into the first passage 30 at a position between the inlet 32 of the first passage and the outlet 34 of the first passage. The injection means 18 injects the predetermined quantity of the liquid dye into the first inlet 38 of the second passage 36 and the carrier fluid supply means 28 supplies carrier fluid to the first inlet 32 of the first passage 30 and the second inlet 44 of the second passage 36. This permits the liquid dye to be swept from the passage 36 by flow of carrier gas.

The body means 42 can be formed from a block, for example, an aluminum block. The block has a first end 46 and a second end 48 and a longitudinal axis (not shown) extending between the first end and the second end. The block also has a side surface 50. The first passage 30 has a first straight portion 52 having a first end which corresponds to the first end 32 of the passage 30 and a second end 54 and a second straight portion 56 having a first end 58 and a second end which corresponds to the second end 34 of the passage 30. The second end 54 of the first straight portion 52 is connected to the first end 58 of the second straight portion 56 by a bent portion 60 of the first passage 30. The inlet 32 to the first passage 30 is positioned at the first end 46 of the block. The first straight portion 52 of the first passage 30 is positioned parallel to the longitudinal axis of the block. The outlet 34 of the first passage 30 is positioned on the side surface 50 of the block. The second passage 36 is positioned parallel to the first straight portion 50 of the first passage 30. The first inlet 38 to the second passage 36 is positioned at the first end 46 of the block. The second inlet 44 to the second passage 36 is positioned on the side surface 50 of the block. The second end 40 of the second passage 36 is connected to the first passage 30 by a capillary bore 62.

The second portion 56 of the first passage 30 has a longitudinal axis (not shown) and the capillary bore 62 has a longitudinal axis (not shown). The longitudinal axis of the capillary bore 62 is positioned with respect to the longitudinal axis of the second portion 56 of the first passage 30 so that fluid flow from the first end 32 of the first passage to the second end 34 of the first passage produces a suction on the capillary bore. A 90 degree angle has been used with good results. The second inlet 44 can also enter the passage 36 at an angle of about 90 degrees. The bent portion 60 of the first passage 30 can also form an angle of about 90 degrees.

The sizing of the passages and bores in the block can vary depending on application. For injecting a quantity of liquid dye having a mass in the range of 10 grams to 100 grams into an air stream, a block about 200 cm long with passages having a diameter in the range of 0.5 to about 1 cm with a capillary bore having a diameter in the range of from about 0.25 to about 2 mm is expected to provide good results. Best results are expected to be obtained in certain applications, such as when testing air conditioner coils, when the liquid dye is atomized by a gas stream. Generally speaking, utilizing small passages and high velocities will tend to promote atomization for such applications.

In a preferred embodiment of the invention, the injection means 18 for injecting a predetermined quantity of a liquid dye into the mixer means 26 comprises a pump 64, a conduit means 66 connecting the pump 64 with the mixer means 26, and a means 68 for driving the pump 64.

In an embodiment of the invention which has been used with good results, the pump 64 comprises a slave cylinder 69. The slave cylinder 69 has a slave cylinder piston 70 slidably mounted in a means 72 for defining a slave cylinder piston chamber. The slave cylinder piston 70 has a first end 74 and a second end 76. A pump chamber 80 is defined between the first end 74 of the slave cylinder piston and a portion of the means 72 for defining the piston chamber. The pump chamber 80 is sized for holding a predetermined quantity of a liquid dye. The conduit means 66 which connects the injector means 18 with the mixer means 26 opens into the pump chamber 80 of the slave cylinder 69 and the means 68 for driving the pump 64 is attached to the second end 76 of the slave cylinder piston 70.

In the illustrated embodiment, a conduit means 82 connects the pump chamber 80 with the source 22 of liquid dye. A first valve means 84 is operably associated with the conduit means 82. A second valve means 86 is operably associated with the conduit means 66 connecting the pump chamber 80 with the mixer means 26. Preferably, the first valve means 84 and the second valve means 86 comprise check valves for preventing liquid flow away from the mixer means 26.

In one embodiment of the invention, the means 68 for driving the pump 64 comprises a drive cylinder 88. The drive cylinder 88 has a drive cylinder piston 90 slidably mounted in a means 92 for defining a drive cylinder piston chamber. The drive cylinder piston 90 has a first end 94 and a second end 96. A first chamber 98 is defined between the first end 94 of the drive cylinder piston 90 and a first portion of the means 92 for defining the drive cylinder piston chamber. A second chamber 100 is defined between the second end 96 of the drive cylinder piston and a second portion of the means 92 for defining the drive cylinder piston chamber. A connecting shaft means 102 connects the first end 94 of the drive cylinder piston with the second end 76 of the slave cylinder piston.

Preferably, the connecting shaft means 102 includes a first connecting shaft 104 attached to the slave cylinder piston 70, a second connecting shaft 106 attached to the drive cylinder piston 90, and an adjustable coupler 108 connecting the first connecting shaft 104 to the second connecting shaft 106. The coupler provides for adjustment of connecting shaft means overall length and can be used to adjust the injection volume of the liquid dye.

A control conduit means 110 is preferably provided for alternately connecting either the first chamber of the drive cylinder or the second chamber of the drive cylinder with a fluid source. Preferably, the control conduit means 110 comprises a control valve 112 having a valve housing 114 and a valve body 116. The valve housing 114 has an inlet port 118 for connection to a fluid source 24, an outlet port 120 for exhausting fluid to the atmosphere, a first drive cylinder port 122, and a second drive cylinder port 124.

The valve body 116 is movable in the valve housing 114 from a first position to a second position. The valve body 116 has a first passage pair 126 for connecting the inlet port 118 of the housing with the first drive cylinder port 122 of the housing and the outlet port 120 of the housing with the second drive cylinder port 124 of the housing when the valve body 116 is in the first position, as shown. The valve body 116 has a second passage pair 128 for connecting the inlet port 118 of the housing with the second drive cylinder port 124 of the housing and the outlet port 120 of the housing with the first drive cylinder port 122 of the housing when the valve body 116 is in the second position (not shown). A first conduit means 130 connects the first drive cylinder port 122 with the first drive cylinder chamber 98. A second conduit means 132 connects the second drive cylinder port 124 with the second drive cylinder chamber 100. An actuator means 134 is provided for moving the valve body 116 from the first position to the second position. A solenoid 136 forms a highly suitable actuator means 134. A conduit means 138 is provided for connecting the inlet port 118 of the valve housing with a fluid source. Preferably, the conduit means 138 for connecting the inlet port 118 of the valve housing with the fluid source includes a pressure regulator 140 operatively associated with the conduit means. An optional pressure gauge 142 is operatively associated with the pressure regulator 140. The conduit means 138 for connecting the inlet port 118 of the valve housing with a fluid source preferably is for connecting the inlet port of the valve housing with the source 24 of carrier fluid. The pressure regulator 140 is for letting down the pressure of the fluid so that the pump 18 is not damaged by the drive when the coupler is adjusted so that the volume of the pump is controlled by bottoming.

The carrier fluid supply means 28 preferably comprises a carrier fluid conduit means 144 for connecting the inlet 32 of the first passage 30 with the source 24 of carrier fluid. The means 28 preferably comprises an on-off valve means 146 operatively associated with the carrier fluid conduit means 144. The means 10 can be employed as a means for actuating the on-off valve means 146 when the valve means 146 is a solenoid valve. The carrier fluid conduit means 144 can optionally comprises a regulator 145 which may be associated with a pressure gauge 147. The regulator is set to the desired test pressure.

In the illustrated embodiment, the apparatus 2 preferably further comprises a fresh test fluid conduit means 148 for connecting the mixer means 26 with an inlet 150 of vessel 12 to be tested to supply a mixture of carrier fluid and dye to the vessel to be tested. A spent test fluid conduit means 152 is provided for connection to an outlet 154 of a vessel 12 to be tested for exhausting the mixture of carrier fluid and dye from the vessel upon the completion of testing. The conduit means 148 and 152 are connected to the vessel 12 preferably by quick connect couplings 156 and 158, respectively. The quick connect couplings are usually provided by the manufacturer of the vessel and will often be in the form of an expandable mandrel having an outer rubber seal. The spent test fluid conduit means 152 preferably further comprises an on-off valve means 160 operatively associated with the spent test fluid conduit means. A solenoid valve forms a highly suitable means 160. When a solenoid valve 160 is used, the means 10 for actuating the on-off valve means 160 is preferably employed.

It is desirable to capture spent dye for recycle and to avoid unnecessary discharge.

In a further preferred embodiment of the invention, the spent test fluid conduit means 152 further comprises a liquid knock out means 162 operatively associated with the spent test fluid conduit means for the recovery of liquid dye. A water separator such as is used with air compressors can be used for this purpose. Generally speaking, the knockout means 162 will have an inlet connected to the means 152, an overhead outlet 164 for the exhaust of gas, and a bottom outlet 166 for the exhaust of liquid dye. The liquid dye recovered by the knock out means can be recycled (preferably after filtration) or disposed of, as desired. Preferably, the valve means 160 is positioned between the knock out means 162 and the vessel 12.

In another embodiment of the invention, there is provided a method which can be used to pressure test a vessel. The method is carried out by introducing a predetermined quantity of a liquid dye into a mixer means. A flow of carrier fluid is initiated through the mixer means to mix the liquid dye in the carrier fluid and form a test mixture. The test mixture into a vessel to be pressure tested. The vessel is then pressurized and inspected for leaks. After inspection, the vessel is depressurized and the cycle is ready to be repeated with another vessel.

In a preferred embodiment of the invention, carrier fluid comprises a gas. Air is most preferred. Atomizing the liquid dye in the mixer means to form a mixture of atomized liquid dye in air is the most preferred way to carry out the invention. In an embodiment of the invention which has been tested with good results, new coils were tested using about 0.5 grams of liquid dye per liter of coil volume. For testing air conditioner systems when in use, it is expected that greater amounts of dye will be required.

In a further preferred embodiment of the invention, check valves (not shown) are provided in the liquid dye line and in the carrier fluid line immediately upstream of the mixer means to prevent fluid from flowing away from the mixer means during the testing of the vessel.

I claim:

1. Apparatus for testing a refrigerant coil prior to assembly into a refrigerant system, said apparatus comprising:

first conduit means for supplying a flow of a mixture of a carrier gas and an atomized UV fluorescent liquid dye to a refrigerant coil to be pressure tested, said refrigerant coil having an inlet and an outlet, said first conduit means having a first valve means operably associated therewith and having a first coupling for coupling directly to the inlet of said refrigerant coil, said first valve means being positionable in an open position or a closed position;

second conduit means for exhausting a flow of a mixture of carrier gas and an atomized UV fluorescent liquid dye from the outlet of said refrigerant coil which has been pressure tested, said second conduit means having a second valve means operably associated therewith and having a second coupling for coupling directly to the outlet of said refrigerant coil, said second valve means being positionable in an open position or a closed position;

third conduit means for introducing a predetermined amount of a UV fluorescent liquid dye into the first conduit means, said third conduit means having an atomization and injection means associated therewith for causing the introduction of the predetermined amount of UV fluorescent liquid dye into the first conduit means in atomized form; and automatic control means having (i) a means for actuating the atomization and injection means to introduce the predetermined amount of UV fluorescent liquid dye in atomized form into the first conduit means;

(ii) a means for positioning the second valve means in the open position, to permit a pressure drop from the inlet to the outlet of said refrigerant coil to be pressure tested;

(iii) a means for positioning a first valve means in the open position, to permit flow of the atomized mixture throughout said refrigerant coil to be pressure tested;

(iv) a means for positioning the second valve means in the closed position, to permit pressurization and testing of sad refrigerant coil to be pressure tested;

(v) a means for positioning the second valve means in the open position, to permit exhaust of the atomized mixture from said refrigerant coil upon completion of pressure testing and to depressurize said refrigerant coil;

(vi) a means for positioning the first valve means in the closed position, to isolate said refrigerant coil from the carrier gas and permit safe disconnection of said refrigerant coil from the first conduit means; and (vii) a means for positioning the second valve means in the closed position, to permit isolation of the second conduit means from the environment when said refrigerant coil is disconnected from the second conduit means;

wherein the automatic control means further includes means for actuating means (i) through (vii) in order.

2. Apparatus as in claim 1 wherein the automatic control means further includes means for actuating means (vi) a predetermined period of time after actuating means (v).

3. Apparatus as in claim 2 wherein the automatic control means further includes means for actuating means (vii) a predetermined period of time after actuating means (vi).

4. Apparatus as in claim 3 further comprising a source of UV fluorescent liquid dye in flow communication with the third conduit means.

5. Apparatus as in claim 4 further comprising a source of compressed air in flow communication with the first conduit means.

6. A method for testing a refrigerant coil prior to assembly into a refrigerant system, said method comprising:

providing a refrigerant coil prior to assembly into a refrigerant system, said refrigerant coil having an inlet and an outlet;

coupling the inlet of said refrigerant coil directly to a first conduit means for supplying a flow of a mixture of a carrier gas and an atomized UV fluorescent liquid dye to said refrigerant coil;

coupling the outlet of said refrigerant coil directly to a second conduit means for exhausting a flow of a mixture of carrier gas and an atomized UV fluorescent liquid dye from the outlet of said refrigerant coil;

introducing a predetermined quantity of a UV fluorescent liquid dye into a mixer means;

initiating a flow of carrier gas through the mixer means to mix the liquid dye in the carrier gas and form an atomized test mixture of UV fluorescent liquid dye in carrier gas;

flowing the atomized test mixture through the first conduit means and into said refrigerant coil;

then pressurizing said refrigerant coil;

inspecting said refrigerant coil for leaks; and depressurizing said refrigerant coil by flowing the atomized test mixture through the second conduit means.

7. A method as in claim 6 wherein the carrier gas comprises compressed air.

8. A method as in claim 7 wherein the carrier gas is mixed in the liquid dye by atomizing the liquid dye in the mixer means.

9. A method as in claim 8 wherein said refrigerant coil is depressurized after the passage of a predetermined time from pressurization.

10. A method as in claim 8 wherein the liquid dye is fluorescent when exposed to light having a predetermined wavelength in the UV range.

11. A method as in claim 10 further comprising exposing an exterior of said refrigerant coil to a light source having the predetermined wavelength while inspecting for leaks.

12. A method as in claim 11 wherein the exterior of said refrigerant coil is exposed to a black light.

13. A method as in claim 12 wherein the atomized liquid dye comprises a solution containing a dyestuff selected from the group consisting of an anthraquinone, a naphthalimide, and a xanthene.

14. A method as in claim 13 wherein about 0.5 grams of liquid dye is used for each liter of volume of said refrigerant coil.

* * * * *